J. A. ROSVOLD.
WAVE BREAKER.
APPLICATION FILED AUG. 21, 1909.
Reissued Dec. 14, 1909.
13,056.
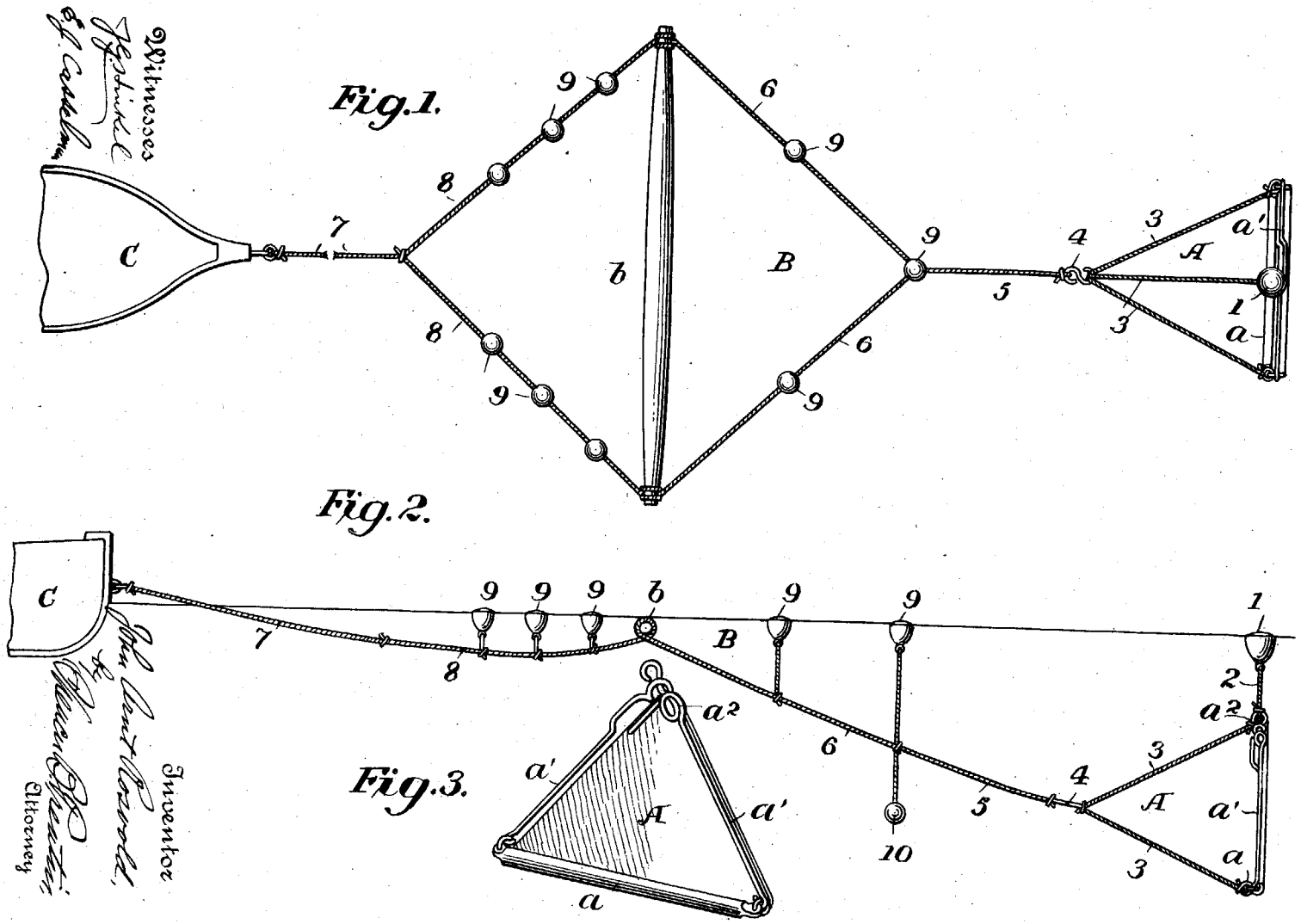
ANDREW. B. GRAHAM CO., PHOTO-LITHOGRAPHERS, WASHINGTON, D. C.

UNITED STATES PATENT OFFICE.

JOHN ARNT ROSVOLD, OF NOME, DISTRICT OF ALASKA.

WAVE-BREAKER.

13,056. Specification of Reissued Letters Patent. Reissued Dec. 14, 1909.

Original No. 898,266, dated September 8, 1908, Serial No. 400,800. Application for reissue filed August 21, 1909. Serial No. 514,077.

*To all whom it may concern:*

Be it known that I, JOHN ARNT ROSVOLD, a citizen of the United States, residing at Nome, Alaska, have invented certain new and useful Improvements in Wave-Breakers, of which the following is a specification.

My invention relates to safety devices for boats and large vessels in time of storm, and has for its object to prevent drifting and at the same time to hold the vessel's head to the waves and break the force of the latter.

The invention consists in the combination of a heavy spar, post or suitable frame arranged with suitable lashings and floats, with an anchor as, for instance, a sea anchor or drag, coöperating as a whole when properly attached to a vessel to hold the vessel's head to the waves, prevent drifting and to break or smooth the waves so that by the time they reach the vessel they have lost their force.

The invention also consists in the various novel details of construction and arrangement of parts hereinafter described, and shown in the accompanying drawings, in which—

Figure 1 is a plan view showing the invention in use connected to a vessel; Fig. 2 is a side elevation of the same; and Fig. 3 is a detail view on enlarged scale showing the construction of the sea anchor or drag.

Referring to the drawings, A is a sea anchor or drag having a pressure surface adapted to work at right angles to the pull of the vessel.

B is the wave breaker, and C is the vessel, the sea anchor or drag being connected to the wave breaker and the latter to the vessel so that the wave breaker lies at a distance from the anchor and between this and the vessel.

The sea anchor or drag A is composed of a triangular frame of which the lower bar *a* is made heavier or weighted and has pivotally attached thereto the side bars *a'*. The side bars are latched together at the apex $a^2$ of the triangle as shown, so that they may be collapsed and lie adjacent the bar *a* for convenience in stowing in the vessel. The frame is preferably of iron, and is covered with canvas to act as a drag. This sea anchor is adapted to work below the surface of the water and is supported at the proper depth by a float 1 to which it is connected by rope or other connection 2. It is connected to the wave breaker by means of ropes 3 which are connected at 4 to a single rope 5.

The wave breaker B consists of a spar, post, or suitable frame *b* connected from its ends to rope 5 by means of ropes 6 on one side, and to rope 7 on the other side by means of ropes 8, rope 7 being attached to the bow of the vessel with which the device is used. The ropes 6 and 8 are so proportioned that the spar *b* is held parallel to the working surface of anchor A, and these ropes are supported at the proper depth below the surface of the water by means of small buoys or floats 9. A weight or sinker 10 is provided at the lead end of rope 5 so as to maintain the proper angle of pull upon the sea anchor A.

It will be observed that the spar *b* is made large and heavy in comparison with the size of the sea anchor and in proportion to the vessel with which it is used, and as it is maintained directly to windward and at a distance both from the anchor and the vessel, directly between them, it operates to break the waves or else smooth them out so that by the time they reach the vessel they have lost their force and the vessel will be in comparative calm, in the "dead swell" as it may be termed. The buoys or floats 9 also operate to assist in breaking the waves. The sea anchor or drag A operates to maintain the wave breaker B in the proper position relatively to the boat or vessel, to hold the vessel's head to the waves, and to prevent drifting with the wind.

The size of the anchor and also of the wave breaker are made to suit the size of the boat or vessel with which they are intended to be used. I will state by way of illustration that with what is known as a "Columbia River Boat", a fishing boat about twenty-six feet long, the size of the anchor should be about four and one half feet and the length of the spar for the wave breaker about ten feet with a diameter of six inches. My wave breaker may be used with other forms of anchor than the sea anchor or drag, such as a permanent mooring or an ordinary anchor.

While I have spoken of ropes as the connecting means, it will be understood, of course, that I contemplate all equivalents thereof such as chains which will probably be used in larger constructions. Also, by the use of the term "spar" I contemplate all equivalents such as any kind of frame for effecting the same purpose.

Having thus described my invention, what I claim as new and desire to secure by Letters Patent of the United States, is:—

1. A safety device for vessels comprising a spar adapted to float upon the surface of the water, connections for maintaining said spar transverse to a line between a vessel and its anchor, and a plurality of floats arranged at intervals on a part at least of said connections adapted to support the same the proper depth below the surface of the water and to coöperate with said spar to break the waves, substantially as described.

2. In a safety device for vessels, the combination with an anchor, of a spar adapted to float upon the water, connections from each end approximately of said spar on one side to said anchor, and on the other side to connecting means for a vessel, and a plurality of floats arranged at intervals along said connections adapted to support the same the proper depth below the surface of the water and to coöperate with said spar to break the waves, substantially as described.

3. In a safety device for vessels, the combination with a sea anchor or drag operative at a depth below the surface of the water, of a spar adapted to float upon the surface of the water, connections from each end approximately of said spar on one side to said sea anchor or drag, and on the other side to a connecting means for a vessel, and a plurality of floats arranged at intervals along said connections adapted to support the same the proper depth below the surface of the water and to coöperate with said spar to break the waves, substantially as described.

4. In a safety device for vessels, the combination with a sea anchor or drag operative at a depth below the surface of the water and consisting of a collapsible frame having a lower weighted bar, side-bars pivotally attached to the ends thereof and making detachable engagement with each other at their opposite ends, and a covering or drag surface for said frame; of a spar adapted to float upon the surface of the water, connections from each end approximately of said spar on one side to said sea anchor or drag, and on the other side to a connecting means for a vessel, and a plurality of floats arranged at intervals along said connections adapted to support the same the proper depth below the surface of the water and to coöperate with said spar to break the waves, substantially as described.

In testimony whereof I have affixed my signature, in presence of two witnesses.

JOHN ARNT ROSVOLD.

Witnesses:
A. S. Kemp,
T. Narhennring.